US006989057B2

(12) United States Patent
Getzlaf et al.

(10) Patent No.: US 6,989,057 B2
(45) Date of Patent: *Jan. 24, 2006

(54) ZEOLITE-CONTAINING CEMENT COMPOSITION

(75) Inventors: Donald A. Getzlaf, Calgary (CA); Karen Luke, Duncan, OK (US); Keith A. Rispler, Red Deer (CA); Russell M. Fitzgerald, Waurika, OK (US); Glen C. Fyten, Red Deer (CA)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/315,415

(22) Filed: Dec. 10, 2002

(65) Prior Publication Data

US 2004/0107877 A1 Jun. 10, 2004

(51) Int. Cl.
*E21B 33/13* (2006.01)
*E21B 33/138* (2006.01)
*C04B 7/00* (2006.01)

(52) U.S. Cl. ............ 106/606; 106/607; 106/608; 106/609; 106/617; 106/618; 106/626; 106/634; 106/672; 106/674; 106/677; 106/813; 106/694; 106/696; 106/706; 106/708; 106/713; 106/717; 106/718; 106/719; 106/724; 106/725; 106/773; 106/774; 106/781; 106/782; 106/803; 106/809; 166/292; 166/293; 166/309

(58) Field of Classification Search ............... 106/813, 106/694, 696, 706, 708, 713, 717, 718, 719, 106/724, 725, 773, 774, 781, 782, 803, 809, 106/606, 607, 608, 609, 617, 618, 626, 634, 106/672, 674, 677; 166/292, 293, 309
See application file for complete search history.

(56) References Cited

U.S. PATENT DOCUMENTS

| 1,943,584 | A |   | 1/1934  | Cross                        |
|-----------|---|---|---------|------------------------------|
| 2,349,049 | A |   | 5/1944  | Means                        |
| 2,662,827 | A |   | 12/1953 | Clark                        |
| 3,359,225 | A |   | 12/1967 | Weisend                      |
| 3,694,152 | A |   | 9/1972  | Sersale et al. ....... 423/329 |
| 3,887,385 | A |   | 6/1975  | Quist et al. ........ 106/96   |
| 4,435,216 | A |   | 3/1984  | Diehl et al. ........ 106/97   |
| 4,482,379 | A |   | 11/1984 | Dibrell et al. ...... 106/76   |
| 4,818,288 | A |   | 4/1989  | Aignesberger et al. .. 106/90 |
| 4,888,120 | A |   | 12/1989 | Mueller et al. ...... 252/8.551 |
| 5,346,012 | A |   | 9/1994  | Heathman et al. ...... 166/293 |
| 5,383,967 | A |   | 1/1995  | Chase ................ 106/737   |
| 5,435,846 | A |   | 7/1995  | Tatematsu et al. ...... 106/813 |
| 5,494,513 | A |   | 2/1996  | Fu et al. ............. 106/672 |
| 5,529,624 | A |   | 6/1996  | Riegler ............... 106/675  |
| 5,626,665 | A |   | 5/1997  | Barger et al. ......... 106/706 |
| 5,711,383 | A | * | 1/1998  | Terry et al. ........... 175/72  |
| 5,788,762 | A |   | 8/1998  | Barger et al. ......... 106/706 |
| 5,980,446 | A |   | 11/1999 | Loomis et al. |
| 6,145,591 | A |   | 11/2000 | Boncan et al. ............ 166/291 |
| 6,153,562 | A |   | 11/2000 | Villar et al. |
| 6,170,575 | B1 |   | 1/2001  | Reddy et al. ............. 166/293 |
| 6,171,386 | B1 |   | 1/2001  | Sabins ................... 106/724 |
| 6,230,804 | B1 |   | 5/2001  | Mueller et al. ........... 166/293 |
| 6,235,809 | B1 |   | 5/2001  | Arias et al. ............. 523/130 |
| 6,245,142 | B1 |   | 6/2001  | Reddy et al. ............. 106/724 |
| 6,312,515 | B1 |   | 11/2001 | Barlet-Gouedard et al. |
| 6,379,456 | B1 |   | 4/2002  | Heathman et al. .......... 106/724 |
| 6,409,819 | B1 |   | 6/2002  | Ko ........................ 106/707 |
| 6,457,524 | B1 | * | 10/2002 | Roddy ..................... 166/293 |
| 6,475,275 | B1 |   | 11/2002 | Nebesnak et al. ........... 106/803 |
| 6,478,869 | B2 |   | 11/2002 | Reddy et al. .............. 106/724 |
| 6,494,951 | B1 |   | 12/2002 | Reddy et al. .............. 106/705 |
| 6,508,305 | B1 |   | 1/2003  | Brannon et al. ............ 166/293 |
| 6,565,647 | B1 |   | 5/2003  | Day et al. ................ 106/813 |
| 6,572,698 | B1 |   | 6/2003  | Ko ........................ 106/772 |
| 6,610,139 | B2 |   | 8/2003  | Reddy et al. .............. 160/724 |
| 6,616,753 | B2 |   | 9/2003  | Reddy et al. .............. 106/718 |
| 6,626,243 | B1 |   | 9/2003  | Boncan .................... 166/293 |
| 6,626,991 | B1 |   | 9/2003  | Drochon et al. |
| 6,645,289 | B2 |   | 11/2003 | Sobolev et al. ............ 160/705 |
| 6,656,265 | B1 |   | 12/2003 | Garnier et al. |
| 6,656,266 | B1 |   | 12/2003 | Barlet-Gouedard et al. |
| 6,660,080 | B2 |   | 12/2003 | Reddy et al. .............. 106/724 |
| 2001/0014651 | A1 |   | 8/2001  | Reddy et al. .............. 502/408 |
| 2002/0077390 | A1 |   | 6/2002  | Gonnon et al. ............. 524/42 |
| 2002/0091177 | A1 |   | 7/2002  | Gonnon et al. ............. 524/5 |
| 2002/0117090 | A1 |   | 8/2002  | Ku ........................ 106/737 |
| 2002/0157575 | A1 |   | 10/2002 | DiLullo et al. ............ 106/711 |
| 2003/0153466 | A1 |   | 8/2003  | Allen et al. |
| 2003/0168215 | A1 |   | 9/2003  | Drochon et al. |
| 2003/0203996 | A1 |   | 10/2003 | Gonnon et al. ............. 524/5 |

(Continued)

FOREIGN PATENT DOCUMENTS

CA 2153372 1/1996

(Continued)

OTHER PUBLICATIONS

SPE 20624 entitled "Acidization of Analcime-Cementing Sandstone, Gulf of Mexico", by D.R. Underdown et al., dated 1990.
SPE 39595 entitled "Designing a Remedial Acid Treatment for Gulf of Mexico Deepwater Turbidute Sands Containing Zeolite Cement", by B.A. Rogers et al., dated 1998.
Paper entitled "Tectonics, fluid migration, and fluid pressure in a Deformed forearc basin, Cook Inlet, Alaska", by R.L. Bruhn et al., pp. 550-563, dated 2000.

(Continued)

*Primary Examiner*—Elizabeth D. Wood
(74) *Attorney, Agent, or Firm*—Craig W. Roddy; Haynes and Boone, LLP

(57) ABSTRACT

A method and cement composition is provided for sealing a subterranean zone penetrated by a well bore, wherein the cement composition comprises zeolite, cementitious material, and water sufficient to form a slurry.

45 Claims, No Drawings

U.S. PATENT DOCUMENTS

| | | |
|---|---|---|
| 2004/0007162 A1 | 1/2004 | Morioka et al. ............. 106/714 |
| 2004/0007360 A1 | 1/2004 | Leroy-Delage et al. |
| 2004/0035331 A1 | 2/2004 | Volpert |
| 2004/0040475 A1 | 3/2004 | Roij ........................... 106/819 |
| 2004/0107877 A1 | 6/2004 | Getzlaf et al. .............. 106/813 |
| 2004/0108113 A1 | 6/2004 | Luke et al. ................. 166/292 |
| 2004/0112255 A1 | 6/2004 | Bruno et al. |
| 2004/0112600 A1 | 6/2004 | Luke et al. ................. 166/295 |
| 2004/0168803 A1 | 9/2004 | Reddy et al. |
| 2004/0188091 A1 | 9/2004 | Luke et al. |
| 2004/0188092 A1 | 9/2004 | Santra et al. |
| 2004/0244977 A1 | 12/2004 | Luke et al. ................. 166/292 |
| 2005/0000734 A1 | 1/2005 | Getzlaf et al. ................ 175/73 |
| 2005/0133222 A1 | 6/2005 | Arias et al. |

FOREIGN PATENT DOCUMENTS

| | | |
|---|---|---|
| EP | 0621247 | 7/1999 |
| EP | 0 1260 491 A1 | 11/2002 |
| EP | 1428805 | 6/2004 |
| FR | 763.998 | 11/1933 |
| GB | 1469954 | 4/1977 |
| JP | 52117316 | 1/1977 |
| JP | 07 003254 | 1/1995 |
| JP | 1011487 | 4/1998 |
| SU | 1373781 A | 2/1988 |
| WO | WO 97/28097 | 8/1997 |
| WO | WO 00/50357 | 8/2000 |
| WO | WO01/70646 | 9/2001 |

OTHER PUBLICATIONS

Paper entitled "Hydraulic Conductivity Measurement On Discrete Samples Collected From Leg 141, Site 863", by Kevin Brown, pp. 401-405, dated 1995.

Paper entitled "Alteration of Clay Minerals And Zeolites In Hydrothermal Brines", by Sridhar Komarneni et al., papes 383-391, dated 1983.

Paper entitled "A Non-Conventional Way of Developing Cement Slurry For Geothermal Wells", by V. Barlet-Gouedard et al., pp. 85-91, dated 2001.

Paper entitled "Portland-Zeolite-Cement For Minimizing Alkali-Aggregate Expansion", by R. Sersale, pp. 404-410, dated 1987.

Paper entitled "Zeolite Crystallization In Portland Cement Concrete Due To Alkali-Aggregate Reaction", by S.A. Marfil et al., paged 1283-1288, dated 1993.

Paper entitled "A Study on the hydration rate of natural zeolite blended Cement pastes", by C.S. Poon et al., pp. 427-432, dated 1999.

Paper entitled "Zeolite ceramsite cellular concrete", by N-Q. Feng pp. 117-122, dated 2000.

Paper entitled "Immobilization of caesium-loaded ion exchange resins in Zeolite-cement blends", by Sandor Bagosi et al., pp. 479-485, dated 1999.

Paper entitled "Effect of Bentonite and Zeolite on Durability of Cement Suspension under Sulfate Attack", by Ivan Janotka, pp. 710-715, dated 1988.

Paper entitled "Reuse of waste catalysts from petrochemical industries For cement substitution", by Nan Su et al., pp. 1773-1783, dated 2000.

Paper entitled "Extreme vertices design of concrete with combined Mineral admixtures", by Jian-Tong Ding et al., pp. 957-960, dated 1999.

Paper entitled "The Properties of Mortar Using Blends, With Portland Cement Clinker, Zeolite Tuff and Gypsum", by Ivan Janotka, et al., pp. 105-110, dated 1995.

Paper entitled "Study on the suppression effect of natural zeolite on Expansion of concrete due to alkali-aggregate reaction", by Feng Naiqian et al., pp. 17-24, dated 1998.

Paper entitled "Comparative study of the initial surface absorption and Cloride diffusion of high performance zeolite, silica fume and PFA Concrete", by Sammy Y.N. Chan et al., pp. 293-300, dated 1999.

Paper entitled "A study on the hydration rate of natural zeolite Blended cement pastes", by C.S. Poon et al., pp. 427-432, dated 1999.

Baroid Brochure entitled "Aquagel Gold Seal®" dated 2002.

Halliburton brochure entitled "CFR-2 Cement Friction Reducer" dated 1999.

Halliburtion brochure entitled "CFR-3 Cement Friction Reducer" dated 1998.

Paper entitled "Zeolite P In Cements: Its Potential For Immboilizing Toxic And Radioactive Waste Species," by M. Atkins, et al., 1995.

Foreign communication from a related counterpart application dated Mar. 25, 2004.

International Center for Materals Technology Promotion, "Special Cements and Their Production Technology: CSA Series, Hydraulic Cement Series, Oil Well Cement Series etc: Hydraulic Engineering Cement", (2003).

Portland Cement Association, "Portland Cement, Concrete, and Heat of hydration", Concrete Technology Today, (1997), pp. 1-4, vol. 18, No. 2, Construction Information Services Department of the Portland Cement Association.

Communication from the European Patent Office, dated Aug. 23, 2004, regarding European Application No. 03252598.2, which claims priority to U.S. Appl. No. 10/315,415.

Foreign communication from a related counterpart application dated Nov. 25, 2004.

Communication from the US Patent and Trademark Office, dated Nov. 18, 2004, regarding Application No. 10/686,098, which is related to U.S. Appl. No. 10/315,415.

Communication from the US Patent Trademark Office, dated Apr. 26, 2005, regarding Application No. 10/686,098, which is related to U.S. Appl. No. 10/315,415.

Communication from the US Patent and Trademark Office, dated May 9, 2005, regarding Application No. 10/686,098, which is related to U.S. Appl. No. 10/315,415.

* cited by examiner

ZEOLITE-CONTAINING CEMENT COMPOSITION

BACKGROUND

The present embodiment relates generally to a method and cement composition for sealing a subterranean zone penetrated by a well bore.

In the drilling and completion of an oil or gas well, a cement composition is often introduced in the well bore for cementing pipe string or casing. In this process, known as "primary cementing," the cement composition is pumped into the annular space between the walls of the well bore and the casing. The cement composition sets in the annular space, supporting and positioning the casing, and forming a substantially impermeable barrier, or cement sheath, which isolates the well bore from subterranean zones.

Changes in pressure or temperature in the well bore over the life of the well can produce stress on the cement composition. Also, activities undertaken in the well bore, such as pressure testing, well completion operations, hydraulic fracturing, and hydrocarbon production can impose stress. When the imposed stresses exceed the stress at which the cement fails, the cement sheath can no longer provide the above-described zonal isolation. Compromised zonal isolation is undesirable, and necessitates remedial operations to be undertaken.

Due to its incompressible nature, neat cement is undesirable for use where there is a chance of expansion or contraction in the well bore. In the past, components such as fumed silica have been added to lower the Young's modulus of cement compositions. However, fumed silica is often subject to shortages, and hence to undesirable variations in costs.

Therefore, a cement composition that can provide elasticity and compressibility, while retaining high compressive and tensile strengths, is desirable.

DESCRIPTION

A cement composition for sealing a subterranean zone penetrated by a well bore, according to the present embodiment comprises zeolite, cementitious material, and water sufficient to form a slurry.

A variety of cements can be used with the present embodiments, including cements comprised of calcium, aluminum, silicon, oxygen, and/or sulfur which set and harden by reaction with water. Such hydraulic cements include Portland cements, pozzolan cements, gypsum cements, aluminous cements, silica cements, and alkaline cements. Portland cements of the type defined and described in API Specification 10, 5$^{th}$ Edition, Jul. 1, 1990, of the American Petroleum Institute (the entire disclosure of which is hereby incorporated as if reproduced in its entirety) are preferred. API Portland cements include Classes A, B, C, G, and H, of which API Classes A and C are particularly preferred for the present embodiment. The desired amount of cement is understandably dependent on the cementing operation.

Zeolite is a porous alumino-silicate mineral that may be either a natural or manmade material. It is understood that for the purpose of this patent application, the term "zeolite" refers to and encompasses all natural or manmade forms. All zeolites are composed of a three-dimensional framework of $SiO_4$ and $AlO_4$ in a tetrahedron, which creates a very high surface area. Cations and water molecules are entrained into the framework. Thus, all zeolites may be represented by the formula:

$$M_{a/n}[(AlO_2)_a(SiO_2)_b]xH_2O$$

where M is a cation such as Na, K, Mg, Ca, or Fe; and the ratio of b:a is in a range from greater than or equal to 1 and less than or equal to 5. Some common examples of zeolites include analcime (hydrated sodium aluminum silicate); chabazite (hydrated calcium aluminum silicate); harmotome (hydrated barium potassium aluminum silicate); heulandite (hydrated sodium calcium aluminum silicate); laumontite (hydrated calcium aluminum silicate); mesolite (hydrated sodium calcium aluminum silicate); natrolite (hydrated sodium aluminum silicate); phillipsite (hydrated potassium sodium calcium aluminum silicate); scolecite (hydrated calcium aluminum silicate); stellerite (hydrated calcium aluminum silicate); stilbite (hydrated sodium calcium aluminum silicate); and thomsonite (hydrated sodium calcium aluminum silicate).

Zeolites are widely used as cation exchangers, desiccants, solid acid catalysts, and absorbents. Applicants believe that in cement compositions, zeolites enhance the compressive strength and decrease porosity as a result of pozzolanic reaction, similar to that of conventional pozzolans such as fly ash, fumed silica, slag, and diatomaceous earth. As shown in the following examples, zeolites provide enhanced properties in a number of oil well cementing applications, creating lightweight slurries. For example, at low temperatures, the pozzolanic reaction produces increased early compressive strength development. Furthermore, the zeolite cement slurries of the present embodiments exhibit thixotropic properties which can be of benefit in such applications as gas migration control, lost circulation and squeeze cementing. Moreover, the zeolite cement slurries of the present embodiments impart fluid loss control qualities, thereby maintaining a consistent fluid volume within a cement slurry, preventing formation fracture (lost circulation) or flash set (dehydration).

In one embodiment of the invention, zeolite is present in an amount of about 1% to about 95% by weight of the cement, and more preferably in an amount of about 5% to about 75% by weight of the cement. In another embodiment, zeolite may be used as an extender for lightweight slurries. In this use, the zeolite is present in an amount of about 30% to about 90% by weight of the cement, and more preferably in an amount of about 50% to about 75% by weight of the cement. Without limiting the scope of the invention, it is understood that the above-described zeolite cement mixtures can be used as lightweight cements, normal weight cements, densified cements, and squeeze cements. Moreover, zeolite may be used as a suspending aid, thixotropic agent, particle packing agent, strength retrogression prevention agent, strength enhancer, foamed cement-stability agent, and a low temperature accelerator.

Water in the cement composition is present in an amount sufficient to make a slurry which is pumpable for introduction down hole. The water used to form a slurry in the present embodiment can be fresh water, unsaturated salt solution, including brines and seawater, and saturated salt solution. Generally, any type of water can be used, provided that it does not contain an excess of compounds, well known to those skilled in the art, that adversely affect properties of the cement composition. The water is present in an amount of about 22% to about 200% by weight of the cement, and more preferably in an amount of about 40% to about 100% by weight of the cement.

In an alternative embodiment, conventional accelerating additives such as sodium chloride, sodium sulfate, sodium aluminate, sodium carbonate, calcium sulfate, aluminum sulfate, potassium sulfate, and alums can be added to further increase early compressive strength development of the cement composition. The accelerating additives are present in an amount of about 0.5% to about 10% by weight of the cement, and more preferably in an amount of about 3% to about 7% by weight of the cement.

In an alternative embodiment, conventional dispersants may be added to control fluid loss, such as a sulfonated acetone formaldehyde condensate available from SKW Polymers GmbH, Trostberg, Germany. The dispersant is present in a range from about 0.01% to about 2%.

A variety of additives may be added to the cement composition to alter its physical properties. Such additives may include slurry density modifying materials (e.g., silica flour, sodium silicate, microfine sand, iron oxides and manganese oxides), dispersing agents, set retarding agents, set accelerating agents, fluid loss control agents, strength retrogression control agents, and viscosifying agents well known to those skilled in the art.

The following examples are illustrative of the methods and compositions discussed above.

EXAMPLE 1

Components in the amounts listed in TABLE 1 were added to form four batches of a normal density slurry. The batches were prepared according to API Specification RP 10B, $22^{nd}$ Edition, 1997, of the American Petroleum Institute (the entire disclosure of which is hereby incorporated as if reproduced in its entirety).

The cement for all batches was Class A cement. The cement amounts are reported as percentages by weight of the composition ("%"). The water and zeolite amounts in this example are reported as percentages by weight of the cement ("%bwoc"). The density was conventionally measured, and reported in pounds per gallon ("lb/gal").

Zeolite was obtained from C2C Zeolite Corporation, Calgary, Canada, and mined from Bowie, Ariz., USA.

TABLE 1

| Components | Batch 1 | Batch 2 | Batch 3 | Batch 4 |
| --- | --- | --- | --- | --- |
| Water (% bwoc) | 46.7 | 56.9 | 46.7 | 56.9 |
| Cement (%) | 100 | 100 | 100 | 100 |
| Zeolite (% bwoc) | 0 | 10 | 0 | 10 |
| Density (lb/gal) | 15.6 | 15.0 | 15.6 | 15.0 |
| Temperature (° F.) | 40 | 40 | 60 | 60 |
| Compressive strength @ 12 hours (psi) | 190 | 322 | 555 | 726 |
| Compressive strength @ 24 hours (psi) | 300 | 753 | 1450 | 1507 |
| Compressive strength @ 48 hours (psi) | — | 1554 | 2500 | 2600 |

TABLE 1 shows that batches with zeolite (Batches 2 and 4) had higher compressive strengths than conventional cement slurries (Batches 1 and 3).

EXAMPLE 2

Components in the amounts listed in TABLE 2 were added to form four batches of a lightweight pozzolanic slurry. The batches were prepared according to API Specification RP 10B.

The cement for all batches was Class C cement. Zeolite was the same as in EXAMPLE 1. Fumed silica was obtained from either Fritz Industries, Mesquite, Tex., USA, or Elkem Group, Oslo, Norway.

TABLE 2

| Components | Batch 1 | Batch 2 | Batch 3 | Batch 4 |
| --- | --- | --- | --- | --- |
| Water (%) | 110 | 110 | 110 | 110 |
| Cement (%) | 100 | 100 | 100 | 100 |
| Fumed silica (% bwoc) | 22 | 0 | 22 | 0 |
| Zeolite (% bwoc) | 0 | 22 | 0 | 22 |
| Density (lb/gal) | 12.0 | 12.0 | 12.0 | 12.0 |
| Temperature (° F.) | 80 | 80 | 180 | 180 |
| Compressive strength @ 12 hours (psi) | 79 | 61 | 743 | 704 |
| Compressive strength @ 24 hours (psi) | 148 | 133 | 944 | 900 |
| Compressive strength @ 48 hours (psi) | 223 | 220 | 1000 | 921 |
| Compressive strength @ 72 hours (psi) | 295 | 295 | 1000 | 921 |
| Thickening Time (hr:min) | 5:20 | 4:03 | 5:43 | 4:15 |
| Plastic Viscosity (cP) | 41.4 | 49.9 | 16.9 | 18.3 |
| Yield point (lb/100 ft$^2$) | 23.6 | 25.3 | 12.3 | 10.3 |

TABLE 2 shows that batches with zeolite (Batches 2 and 4) are an acceptable substitute for conventional fumed silica cement slurries (Batches 1 and 3).

EXAMPLE 3

Components in the amounts listed in TABLE 3 were added to form five batches of a lightweight microsphere slurry. The batches were prepared according to API Specification RP 10B.

The cement for all batches was Class C cement. Zeolite and fumed silica were the same as in EXAMPLE 2. Each batch also contained 50% bwoc cenospheres (hollow ceramic microspheres), such as are available from Q Corp., Chattanooga, Tenn., USA.

TABLE 3

TABLE 3 shows that batches with zeolite (Batches 2 and 5) did not settle, leading the Applicants to propose that zeolite acts as an anti-settling agent, as does conventional fumed silica (Batch 4).

| Components | Batch 1 | Batch 2 | Batch 3 | Batch 4 | Batch 5 |
| --- | --- | --- | --- | --- | --- |
| Water (% bwoc) | 98 | 98 | 98 | 98 | 98 |
| Cement (%) | 100 | 100 | 100 | 100 | 100 |
| Fumed silica (% bwoc) | 0 | 0 | 0 | 15 | 0 |
| Zeolite (% bwoc) | 0 | 15 | 0 | 0 | 15 |
| Density (lb/gal) | 11.5 | 11.5 | 11.5 | 11.5 | 11.5 |
| Temperature (° F.) | 120 | 120 | 200 | 200 | 200 |
| Compressive strength @ 24 hours (psi) | 1107 | 1110 | 1202 | 2225 | 2026 |
| Compressive strength @ 48 hours (psi) | 1621 | 1734 | 1940 | 2669 | 2276 |
| Compressive strength @ 72 hours (psi) | 1942 | 1942 | 1789 | 2726 | — |
| Comments | settling | no settling | settling | no settling | no settling |

EXAMPLE 4

Components in the amounts listed in TABLE 4 were added to form three types of an 11.7 lb/gal density slurry. The types were prepared according to API Specification RP 10B. The cement for all batches was Class C cement. Fumed silica was the same as in EXAMPLE 2.

Slurry type 1 was a conventional slurry containing prehydrated bentonite. Bentonite was obtained from Halliburton Energy Services, Inc., Houston, Tex. USA, and is sold under the trademark "AQUA GEL GOLD."

Slurry type 2 was a conventional slurry containing a 5% bwoc accelerating additive (1% sodium meta silicate; 2% sodium sulfate; 2% calcium chloride), 1% bwoc prehydrated bentonite, and 19% bwoc fly ash. Fly ash was obtained from Ascor Technologies, Calgary, Alberta, Canada (samples obtained at Sheerness and Battle River).

Slurry type 3 was a slurry according to one embodiment of the present invention. Zeolite is given as a percentage by weight of the composition. Zeolite was obtained from C2C Zeolite Corporation, Calgary, Canada, and mined from Princeton, BC, Canada. The zeolite was further divided by particle size, i.e., its ability to pass through conventional mesh screens (sizes 1, 2, 3, etc.).

TABLE 4

| Components | Type 1 | Type 2 | Type 3 |
|---|---|---|---|
| Water % | 154 | 114 | 130 |
| Cement % | 100 | 60 | 60 |
| Bentonite % bwoc | 4 | 1 | 0 |
| Fly ash % bwoc | 0 | 19 | 0 |
| Fumed silica % bwoc | 0 | 15 | 0 |
| Zeolite (mesh size 1) % | 0 | 0 | 30 |
| Zeolite (mesh size 2) % | 0 | 0 | 10 |
| Density (lb/gal) | 11.7 | 11.7 | 11.7 |
| Time to 50 psi at 68° F. (hr:min) | no set | 4:43 | 9:21 |
| Time to 50 psi at 86° F. (hr:min) | no set | 3:16 | — |
| Time to 50 psi at 104° F. (hr:min) | 21:31 | 3:36 | 4:13 |
| Time to 50 psi at 122° F. (hr:min) | 8:12 | — | 1:45 |
| Time to 500 psi at 68° F. (hr:min) | N/A | 52:14 | 52:30 |
| Time to 500 psi at 86° F. (hr:min) | N/A | 22:57 | 19:10 |
| Time to 500 psi at 104° F. (hr:min) | N/A | 16:05 | 16:45 |
| Time to 500 psi at 122° F. (hr:min) | N/A | — | 11:07 |

TABLE 4 shows that zeolite cement (Type 3) sets faster than conventional bentonite cement (Type 1) even at low temperatures, and delivers results similar to conventional fumed silica slurries (Type 2).

EXAMPLE 5

Components in the amounts listed in TABLE 5 were added to form five batches of an 11.7 lb/gal density slurry. The batches were prepared according to API Specification RP 10B.

The cement for all batches was Class C cement. Zeolite was the same as in EXAMPLE 4. The accelerating additive for Batch 2 was calcium sulfate, the accelerating additive for Batch 3 was sodium aluminate, and the accelerating additive for Batches 4 and 5 was sodium sulfate.

TABLE 5

TABLE 5 shows that zeolite cements set with all accelerating additives, as illustrated by the increasing compressive strengths.

| Components | Batch 1 | Batch 2 | Batch 3 | Batch 4 | Batch 5 |
|---|---|---|---|---|---|
| Water % | 130 | 130 | 130 | 130 | 130 |
| Cement % | 60 | 60 | 60 | 60 | 60 |
| Accelerating additive % bwoc | 0 | 3 | 3 | 3 | 6 |
| Zeolite (mesh size 1) % | 30 | 30 | 30 | 30 | 30 |
| Zeolite (mesh size 2) % | 10 | 10 | 10 | 10 | 10 |
| Density (lb/gal) | 11.7 | 11.7 | 11.7 | 11.7 | 11.7 |
| Temperature ° F. | 122 | 122 | 122 | 122 | 122 |
| Compressive strength @ 12 hours (psi) | 1 | 347 | 258 | 196 | 356 |
| Compressive strength @ 24 hours (psi) | 104 | 355 | 531 | 360 | 745 |
| Compressive strength @ 48 hours (psi) | 400 | 748 | 903 | 687 | 847 |

EXAMPLE 6

Components in the amounts listed in TABLE 6 were added to form five batches of a 15.6 lb/gal slurry. The batches were prepared according to API Specification RP 10B.

The cement for all batches was Class A cement. Zeolite and fumed silica were the same as in EXAMPLE 2. The dispersant was a sulfonated acetone formaldehyde condensate available from SKW Polymers GmbH, Trostberg, Germany.

Fluid loss was tested under standard conditions according to Section 10 of API Specification RP 10B, $22^{nd}$ Edition, 1997, of the American Petroleum Institute (the entire disclosure of which is hereby incorporated as if reproduced in its entirety).

TABLE 6

TABLE 6 shows that batches with zeolite (Batches 2, 3, 5, 6, 8, and 9) control fluid loss better than conventional cement. Also, the fluid loss control improves with increasing concentration of the dispersant.

| Components | Batch 1 | Batch 2 | Batch 3 | Batch 4 | Batch 5 | Batch 6 | Batch 7 | Batch 8 | Batch 9 |
|---|---|---|---|---|---|---|---|---|---|
| Water % | 46.6 | 47.8 | 49 | 46.0 | 47.8 | 49 | 45.8 | 47.8 | 49 |
| Cement % | 100 | 100 | 100 | 100 | 100 | 100 | 100 | 100 | 100 |
| Zeolite % bwoc | 0 | 5 | 10 | 0 | 5 | 10 | 0 | 5 | 10 |
| Dispersant % bwoc | 0 | 0 | 0 | 1 | 1 | 1 | 1.5 | 1.5 | 1.5 |
| Density (lb/gal) | 15.6 | 15.6 | 15.6 | 15.6 | 15.6 | 15.6 | 15.6 | 15.6 | 15.6 |
| Fluid loss at 80° F. (cc/30 min) | 612 | 515 | 417 | 261 | 190 | 139 | 164 | 136 | 89 |
| Fluid loss at 150° F. (cc/30 min) | 590 | 482 | 417 | 328 | 110 | 91 | 287 | — | 69 |

EXAMPLE 7

Components in the amounts listed in TABLE 7 were added to form five batches of a lightweight pozzolanic slurry. The batches were prepared according to API Specification RP 10B.

The cement for all batches was Class C cement. Zeolite and fumed silica were the same as in EXAMPLE 2. Under standard conditions set out in Section 15.6, Sedimentation Test, of API Specification RP 10B, $22_{nd}$ Edition, 1997, of the American Petroleum Institute, the batches were placed in corresponding cylinders and allowed to set for 24 hours. Each cylinder was then divided into segments, and the density for each segment was determined by conventional means. It is understood that the absence of settling is indicated by minimal variation in density values among the sections of a given cylinder, as shown in TABLE 7.

TABLE 7

TABLE 7 shows that batches with zeolite (Batches 2, 4, and 7) did not settle.

| Components | Batch 1 | Batch 2 | Batch 3 | Batch 4 | Batch 5 | Batch 6 | Batch 7 |
|---|---|---|---|---|---|---|---|
| Water % | 110 | 110 | 110 | 110 | 110 | 110 | 110 |
| Cement % | 56 | 56 | 56 | 56 | 56 | 56 | 56 |
| Fumed silica % bwoc | 22 | 0 | 22 | 0 | 0 | 22 | 0 |
| Zeolite % bwoc | 0 | 22 | 0 | 22 | 0 | 0 | 22 |
| Initial density (lb/gal) | 12.0 | 12.0 | 12.0 | 12.0 | 12.0 | 12.0 | 12.0 |
| Temperature (° F.) | 80 | 80 | 180 | 180 | 200 | 200 | 200 |
| Settling Test Top Segment (lb/gal) | 11.6 | 12.3 | 11.7 | 12.4 | 12.7 | 12.3 | 12.9 |
| 2nd Segment (lb/gal) | 12.0 | 12.4 | 11.7 | 12.5 | 13.3 | 12.3 | 12.8 |
| 3rd Segment (lb/gal) | 12.0 | 12.4 | 11.7 | 12.4 | 13.1 | 12.1 | 12.9 |
| 4th Segment (lb/gal) | 11.9 | 12.4 | 11.8 | 12.3 | — | — | — |
| 5th Segment (lb/gal) | 11.9 | 12.4 | — | 12.3 | — | — | — |
| Comments | settling | no settling | no settling | no settling | settling | no settling | no settling |

In a preferred method of sealing a subterranean zone penetrated by a well bore, a cement composition comprising zeolite, cementitious material, and water is prepared. The cement composition is placed into the subterranean zone, and allowed to set therein.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of this invention as defined in the following claims.

The invention claimed is:

1. A method of performing cementing operations in a subterranean zone penetrated by a well bore comprising:
   preparing a cement composition comprising zeolite, cementitious material, and water, wherein the zeolite is present in a range of from more than about 40% to about 95% by weight of the cementitious material in the composition, and wherein the zeolite is selected from the group consisting of analcime (hydrated sodium aluminum silicate); chabazite (hydrated calcium aluminum silicate); harmotome (hydrated barium potassium aluminum silicate); heulandite (hydrated sodium calcium aluminum silicate); laumontite (hydrated calcium aluminum silicate); mesolite (hydrated sodium calcium aluminum silicate); natrolite (hydrated sodium aluminum silicate); phillipsite (hydrated potassium sodium calcium aluminum silicate); scolecite (hydrated calcium aluminum silicate); stellerite (hydrated calcium aluminum silicate); stilbite (hydrated sodium calcium aluminum silicate); and thomsonite (hydrated sodium calcium aluminum silicate);
   placing the cement composition into the subterranean zone; and
   allowing the cement composition to set therein.

2. The method of claim 1 wherein the zeolite is represented by the formula:

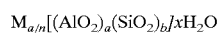

$$M_{a/n}[(AlO_2)_a(SiO_2)_b]xH_2O$$

where M is a cation such as Na, K, Mg, Ca, or Fe; and the ratio of b:a is in a range from greater than or equal to 1 and less than or equal to 5.

3. The method of claim 1 wherein the zeolite is present in a range of from more than about 40% to about 75% by weight of the cementitious material in the composition.

4. The method of claim 1 wherein the zeolite is present in a range of from more than about 40% to about 90% by weight of the cementitious material in the composition.

5. The method of claim 1 wherein the zeolite is present in a range of about 50% to about 75% by weight of the cementitious material in the composition.

6. The method of claim 1 wherein the cementitious material is Portland cement, pozzolan cement, gypsum cement, aluminous cement, silica cement, or alkaline cement.

7. The method of claim 1 wherein the water is present in a range of about 22% to about 200% by weight of the cementitious material.

8. The method of claim 1 wherein the water is present in a range of about 40% to about 100% by weight of the cementitious material.

9. The method of claim 1 wherein the cement composition further comprises an accelerating additive.

10. The method of claim 9 wherein the accelerating additive is present in an amount of about 0.5% to about 10% by weight of the cementitious material.

11. The method of claim 9 wherein the accelerating additive is present in an amount of about 3% to about 7% by weight of the cementitious material.

12. The method of claim 9 wherein the accelerating additive is sodium chloride, sodium sulfate, sodium aluminate, sodium carbonate, calcium sulfate, aluminum sulfate, potassium sulfate, or alum.

13. The method of claim 1 wherein the cement composition further comprises a dispersant.

14. The method of claim 13 wherein the dispersant is a sulfonated acetone formaldehyde condensate.

15. The method of claim 13 wherein the dispersant is present in an amount of about 0.01% to about 2% by weight of the cementitious material.

16. The method of claim 1 wherein the cement composition further comprises cenospheres.

17. The method of claim 16 wherein the cenospheres are present in an amount of about 30% to about 60% by weight of the cementitious material.

18. A method of performing cementing operations comprising:
preparing a cement composition comprising cementitious material, water, and zeolite;
placing the cement composition in a subterranean zone; and
allowing the cement composition to set therein,
wherein the zeolite is present in the cement composition in more than one particle size,
wherein the zeolite is present in the cement composition in an amount of at least about 40% by weight of the cementitious material, and
wherein the zeolite is selected from the group consisting of analcime (hydrated sodium aluminum silicate); chabazite (hydrated calcium aluminum silicate); harmotome (hydrated barium potassium aluminum silicate); heulandite (hydrated sodium calcium aluminum silicate); laumontite (hydrated calcium aluminum silicate); mesolite (hydrated sodium calcium aluminum silicate); natrolite (hydrated sodium aluminum silicate); phillipsite (hydrated potassium sodium calcium aluminum silicate); scolecite (hydrated calcium aluminum silicate); stellerite (hydrated calcium aluminum silicate); stilbite (hydrated sodium calcium aluminum silicate); and thomsonite (hydrated sodium calcium aluminum silicate).

19. The method of claim 18 wherein the zeolite is represented by the formula:

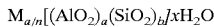

$$M_{a/n}[(AlO_2)_a(SiO_2)_b]xH_2O$$

where M is a cation such as Na, K, Mg, Ca, or Fe; and the ratio of b:a is in a range from greater than or equal to 1 and less than or equal to 5.

20. The method of claim 18 wherein the amount of zeolite present in the cement composition is in a range of from about 40% to about 95% by weight of the cementitious material in the composition.

21. The method of claim 18 wherein the amount of zeolite present in the cement composition is in a range of from about 40% to about 75% by weight of the cementitious material in the composition.

22. The method of claim 18 wherein the amount of zeolite present in the cement composition is in a range of about 50% to about 75% by weight of the cementitious material in the composition.

23. The method of claim 18 wherein the cementitious material is Portland cement, pozzolan cement, gypsum cement, aluminous cement, silica cement, or alkaline cement.

24. The method of claim 18 wherein the water is present in a range of about 22% to about 200% by weight of the cementitious material.

25. The method of claim 18 wherein the water is present in a range of about 40% to about 100% by weight of the cementitious material.

26. The method of claim 18 wherein the cement composition further comprises an accelerating additive.

27. The method of claim 26 wherein the accelerating additive is present in an amount of about 0.5% to about 10% by weight of the cementitious material.

28. The method of claim 26 wherein the accelerating additive is present in an amount of about 3% to about 7% by weight of the cementitious material.

29. The method of claim 26 wherein the accelerating additive is sodium chloride, sodium sulfate, sodium aluminate, sodium carbonate, calcium sulfate, aluminum sulfate, potassium sulfate, or alum.

30. The method of claim 18 wherein the cement composition further comprises a dispersant.

31. The method of claim 30 wherein the dispersant is a sulfonated acetone formaldehyde condensate.

32. The method of claim 30 wherein the dispersant is present in an amount of about 0.01% to about 2% by weight of the cementitious material.

33. The method of claim 18 wherein the cement composition further comprises cenospheres.

34. The method of claim 33 wherein the cenospheres are present in an amount of about 30% to about 60% by weight of the cementitious material.

35. A method of performing cementing operations comprising:
preparing a cement composition comprising cementitious material, water and zeolite, which zeolite is present in an amount of at least 15% by weight of the cementitious material in the composition and is at least one of analcime (hydrated sodium aluminum silicate); chabazite (hydrated calcium aluminum silicate); harmotome (hydrated barium potassium aluminum silicate); heulandite (hydrated sodium calcium aluminum silicate); laumontite (hydrated calcium aluminum silicate); mesolite (hydrated sodium calcium aluminum silicate); natrolite (hydrated sodium aluminum silicate); phillipsite (hydrated potassium sodium calcium aluminum silicate); scolecite (hydrated calcium aluminum silicate); stellerite (hydrated calcium aluminum silicate); stilbite (hydrated sodium calcium aluminum silicate); or thomsonite (hydrated sodium calcium aluminum silicate);
placing the cement composition into a subterranean zone; and
allowing the cement composition to set therein.

36. The method of claim 35 wherein the zeolite is present in an amount of at least 30% by weight of the cementitious material in the composition.

37. The method of claim 35 wherein the zeolite is present in an amount of at least 40% by weight of the cementitious material in the composition.

38. The method of claim 35 wherein the zeolite is present in an amount of at least 50% by weight of the cementitious material in the composition.

39. The method of claim 35 wherein the cementitious material is at least one of Portland cement, pozzolan cement, gypsum cement, aluminous cement, silica cement, and alkaline cement.

40. The method of claim 35 wherein the cement composition further comprises an accelerating additive.

41. The method of claim 40 wherein the accelerating additive is at least one of sodium chloride, sodium sulfate, sodium aluminate, sodium carbonate, calcium sulfate, aluminum sulfate, potassium sulfate, and alum.

42. The method of claim 35 wherein the cement composition further comprises a dispersant.

43. The method of claim 42 wherein the dispersant is a sulfonated acetone formaldehyde condensate.

44. The method of claim 35 wherein the cement composition further comprises cenospheres.

45. The method of claim 18 wherein the amount of zeolite present in the composition is at least 50% by weight of the cementitious material.

* * * * *